DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 29

T945,001

STABILIZED POLYOLEFIN COMPOSITIONS

Martin Dexter, 416 Cedar Drive,
Briarcliff Manor, N.Y. 10510

Filed Dec. 26, 1974, Ser. No. 536,671
Int. Cl. C08j *3/20*
U.S. Cl. 260—45.9 NC
No Drawing. 24 Pages Specification

Polymeric compositions, especially polyolefins, employed as insulators of copper wire filled with petroleum jelly is very effectively stabilized with alkylhydroxyphenylalkanoyl hydrazines having the formula

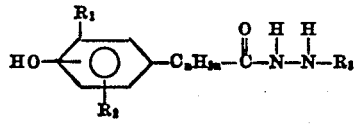

wherein $R_1$ is lower alkyl,
$R_2$ is hydrogen or lower alkyl,
$R_3$ is hydrogen alkanoyl, or the group of the formula

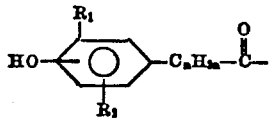

and $n$ is 0 to 5, in combination with phenolic antioxidants, and optionally, a thiosynergist and a phosphite.